United States Patent [19]

Komatsubara

[11] Patent Number: 4,482,511

[45] Date of Patent: Nov. 13, 1984

[54] METHOD OF MANUFACTURING A STAMPER FOR INFORMATION STORAGE DISCS

[75] Inventor: Shigemaru Komatsubara, Sagamihara, Japan

[73] Assignee: Victor Company of Japan, Ltd., Yokohama, Japan

[21] Appl. No.: 410,114

[22] Filed: Aug. 20, 1982

[30] Foreign Application Priority Data

Aug. 21, 1981 [JP] Japan ............................... 56-131216

[51] Int. Cl.$^3$ ........................................... B29D 17/00
[52] U.S. Cl. .................................. 264/22; 264/1.3; 264/2.5; 264/25; 264/130; 264/226; 425/810
[58] Field of Search ................ 425/810; 204/5, 281; 264/220, 224, 225, 226, 227, 22, 1.3, 1.4, 2.5

[56] References Cited

U.S. PATENT DOCUMENTS

| | | | |
|---|---|---|---|
| 2,464,738 | 3/1949 | White et al. | 264/1.4 |
| 3,565,978 | 2/1971 | Folger | 264/227 |
| 3,658,954 | 4/1972 | Broadbent | 264/1.4 |
| 3,798,134 | 3/1974 | Hynes | 264/227 |
| 3,891,514 | 6/1975 | Klemm | 264/281 |
| 4,044,939 | 8/1977 | Horst et al. | 264/1.3 |
| 4,116,753 | 9/1978 | Tojyo et al. | 264/2.5 |
| 4,157,931 | 6/1979 | Bricot et al. | 264/22 |
| 4,166,088 | 8/1979 | Neefe | 264/1.4 |
| 4,198,364 | 4/1980 | Laurie | 264/227 |
| 4,297,312 | 10/1981 | Carroll | 264/225 |
| 4,307,045 | 12/1981 | Imada | 264/22 |
| 4,368,951 | 1/1983 | Blom | 264/1.4 |

Primary Examiner—James Lowe
Attorney, Agent, or Firm—Pollock, Vande Sande & Priddy

[57] ABSTRACT

A metal film is deposited on a photoresist layer having information-dependent pits, and a first film of low surface energy is deposited on the metal film to thereby provide a master for making a stamper blank. A layer of radiation curing resin is deposited on the first film of low surface energy, and then a transparent plate of acrylic resin is placed on the layer of radiation curing resin, which is hardened by exposure to radiation such as ultraviolet radiation through the transparent plate. The transparent plate and the hardened layer are separated as a unitary stamper blank from the master. A second film of low surface energy is then deposited on the stamper blank to form a stamper. The first and second films of low surface energy are made of polymerized octafluorobutane and serve to allow the stamper blank and information storage discs to be released clear of the master and stamper, respectively.

11 Claims, 7 Drawing Figures

METHOD OF MANUFACTURING A STAMPER FOR INFORMATION STORAGE DISCS

BACKGROUND OF THE INVENTION

The present invention relates to a method of manufacturing a stamper for information storage mediums in the form of discs.

Various recording and playback systems have been developed to the point of practical use which utilize information storage mediums in the form of discs containing video and/or audio information recorded as depressions or pits at a high density. Such known discs are made of a copolymer of vinyl chloride and vinyl acetate by a casting process, an embossing process, or a compression molding process, as with ordinary disc records. Alternatively, radiation curing resin such as resin hardenable by exposure to light or an electron beam has been used to form replicas copied from a stamper. Whatever the process, metal stampers are employed to stamp finished discs.

The metal stampers are manufactured according to the following process: A photoresist layer is formed on a surface of a disc of glass which has a high degree of flatness, and then is irradiated with a laser beam or electron beam modulated in intensity by information signals to be recorded. The photoresist layer is then developed to form depressions or pits corresponding to the information signals. A thin film of silver is deposited by chemical plating on the surface of the photoresist layer in a step known as silver mirror treatment to render the photoresist layer surface electrically conductive. Thereafter, a layer of nickel is deposited on the silver film by electroplating, and is separated therefrom, the separated layer of nickel serving as a metal master. Another layer of nickel is deposited on the surface of the metal master by electroplating, followed by separation of the deposited nickel layer as a metal mother from the metal master. A metal stamper is prepared by depositing a layer of nickel on the metal mother by electroplating and detaching the deposited layer of nickel, which can be used as the metal stamper.

The prior metal stamper is therefore fabricated through a number of steps by repeating chemical plating, electroplating, and electroforming processes several times. Such processes, however, produce a large quantity of waste materials such as plating solutions which are a cause of public hazard or environmental pollution.

Discs are produced from the metal stamper thus manufactured in a compression molding process, for example, a disc material is heated and pressed by the stamper on which a pressure ranging from 100 to 150 Kg/cm² is imposed. On the other hand, the stamper is subjected to a much smaller pressure of only a few hundreds g/cm² when the discs are to be made of radiation curing resin. Accordingly, it is reasonable to conclude that stampers used for stamping discs formed of radiation curing resin are not required to be as mechanically strong as the metal stampers conventionally used for pressing discs as in the compressing molding process.

SUMMARY OF THE INVENTION

It is an object of the present invention to provide a method of manufacturing in a smaller number of steps a stamper for information storage discs which will be subjected to a relatively small pressure at the time of pressing the information storage discs.

Another object of the present invention is to provide a method of manufacturing a stamper without producing wastes or causing public hazard or pollution.

According to the present invention, a metal film is deposited by sputtering or vacuum evaporation on a photoresist layer on a disc of glass, which has depressions or pits representing information signals, and a first film of octafluorocyclobutane having low surface energy is deposited on the metal film, thus providing a stamper-forming master. A layer of radiation curing resin is deposited on the first film, and a transparent plate of acrylic resin is placed on the layer of radiation curing resin. The layer of radiation curing resin is hardened by exposure to radiation such as ultraviolet radiation through the transparent plate. The transparent plate and the hardened layer are then separated as a unitary stamper blank from the stamper-forming master. A second film of octafluorocyclobutane having low surface energy is deposited on the hardened layer of the stamper blank to form a stamper.

BRIEF DESCRIPTION OF THE DRAWINGS

The present invention will be described in detail by way of illustrative example with reference to the accompanying drawings, in which.

DETAILED DESCRIPTION

Figure 1:
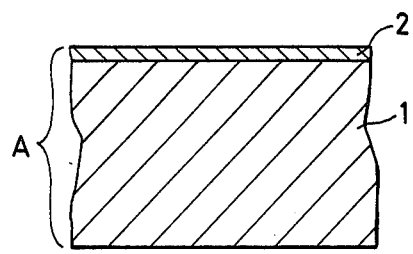
FIGS. 1 through 7 are fragmentary cross-sectional views illustrative of progressive steps of a method of manufacturing a stamper according to the present invention.

FIG. 1 shows an original master A which is a positive composed of a disc 1 of glass having a flat surface and a photoresist layer 2 deposited on the glass disc 1. The photoresist layer 2 is exposed to a laser beam or electron beam which is modulated in intensity by information signals to be recorded and which is radiated onto the original master A by an optical recording apparatus or an electron beam recording apparatus. The photoresist layer 2 is then developed to form a plurality of depressions or pits 3 (FIG. 2) in its surface 2a (hereinafter referred to as "signal surface") which correspond to the information signals.

Figure 2:
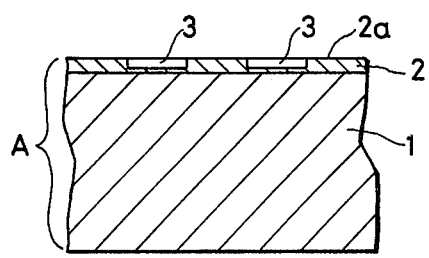
Figure 3:
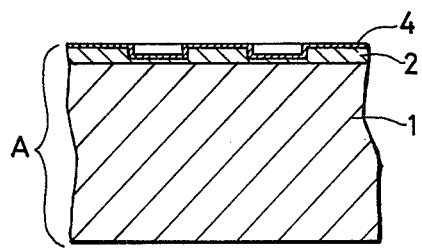

As shown in FIG. 3, a thin film 4 of a metal such as nickel, chromium, or an alloy of nickel and chromium is deposited on the signal surface 2a of the photoresist layer 2 by vacuum evaporation, sputtering or any other suitable process of thin film technology. A sputtering process for depositing the thin metal film 4 on the signal surface 2a will be described in more detail. The glass master A with the information-dependent pits defined in the photoresist layer 2 as shown in FIG. 2 is placed into a vacuum tank, in which the thin film 4 as of nickel which is approximately 400 angstroms thick is deposited by way of sputtering on the signal surface 2a in the atmosphere of an inactive gas, such as an argon gas, under the pressure of approximately $5 \times 10^{-4}$ Torr.

The glass master A on which the thin metal film 4 is deposited as shown in FIG. 3 is put into another vacuum tank in which octafluorocyclobutane is introduced, the pressure within the vacuum tank being $10^{-1}$ Torr. Then, a polymerized film 5 (FIG. 4) of octafluorocyclobutane which is 200 angstroms thick is deposited on the metal film 4 by glow discharge caused in the vacuum tank. The polymerized film 5 of octafluorocyclobutane on the metal film 4 serves as a layer of low surface energy to improve releasability of a stamper from the glass master A. The low surface energy layer 5 provides a signal surface for the master for pressing a stamper.

Figure 4:
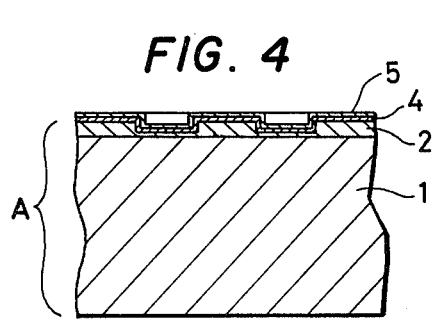

A process for making a stamper with the stamper-forming master as shown in FIG. 4 will now be described.

Figure 5:
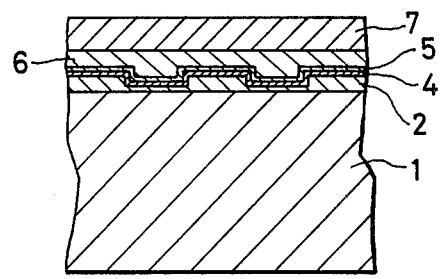

The stamper-forming master A is placed with its signal surface facing up, and a mass of radiation curing resin is dropped onto the signal surface. Then, a plate 7 of acrylic resin having a thickness in the range of from 2 to 5 mm is put on a layer 6 of radiation curing resin as illustrated in FIG. 5, the layer 6 being of a thickness on the order of 200 microns. The radiation curing resin comprises a monomer, oligomer or a mixture of both which can be hardened by exposure to ultraviolet radiation, an electron beam, or microwave. Where ultraviolet radiation is utilized, the radiation curing resin should preferably be an acrylic oligomer such as oligoesteracrylate having methacryloyl or acryloyl groups as end groups or in the side chains of the molecules for the best results.

The layer 6 of radiation curing resin thus formed is required to be free from air bubbles which would be trapped therein. Formation of such layer 6 can easily be carried out.

Figure 6:

The layer 6 of radiation curing resin in FIG. 5 is then hardened by exposure to radiation emitted from a radiation source and passing through the plate 7 of acrylic resin. Where the layer 6 is of a material hardenable by exposure to ultraviolet radiation, it should be irradiated with ultraviolet radiation emitted from the radiation source through the plate 7 of acrylic resin for about one minute. The plate 7 of acrylic resin and the layer 6 of radiation curing resin thus hardened now jointly constitute a unitary stamper blank, which is a negative and separated from the stamper-forming master as shown in FIG. 6.

Figure 7:
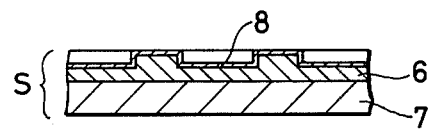

The stamper blank is then put into a vacuum tank containing octafluorocyclobutane under the pressure of $10^{-1}$ Torr, and a polymerized film 8 of octafluorocyclobutane is deposited by glow discharge on a signal surface having projections complementary to the pits 3 in the signal surface of the glass master A, thus forming a stamper S as shown in FIG. 7. The polymerized film 8 of octafluorocyclobutane has a thickness in the range of from 100 to 400 angstroms, and serves as a layer of low surface energy on the finished stamper S.

The stamper fabricating process according to the present invention no longer relies on a chemical plating or electroplating procedure which would be required by conventional processes, and hence is completely free from the problem of producing and treating hazardous waste materials and thus the problem of causing public or environmental pollution. Direct reproduction of the stamper from the glass master results in a smaller number of fabrication processing steps than conventional processing steps, so that the stamper can be manufactured in a greatly reduced interval of time at a low cost. The stamper as fabricated according to the present invention is of high quality since the signal surface of the stamper which is coated with the hardened layer on which the information recorded on the signal surface of the glass master is written with high fidelity.

The layer 5 of low surface energy deposited on the metal film 4 on the photoresist layer 2 of the glass master A allows the stamper as pressed thereby to be released clear of the glass master A after the stamping operation has been finished. The stamper S thus formed contains no signal dropout errors.

Although a certain preferred embodiment of the present invention has been shown and described in detail, it should be understood that various changes and modifications may be made therein without departing from the scope of the appended claims.

What is claimed is:

1. A method of manufacturing a stamper for information storage discs, comprising the steps of:
   providing a master of glass including a photoresist layer having pits thereon which represent information signals;
   depositing a film of metal on said photoresist layer;
   depositing in a vacuum a first polymerized release film of non-metallic material having low surface energy capable of facilitating physical separation of a stamper blank therefrom on said film of metal to thereby provide a stamper-forming master having a first signal surface containing said pits;
   placing a substantially transparent plate on said signal surface with a layer of radiation curing resin interposed therebetween;
   irradiating said layer of radiation curing resin with radiation through said substantially transparent plate to harden said layer of radiation curing resin;
   separating said substantially transparent plate and said hardened layer as a unitary stamper blank from said first film of said stamper-forming master, said unitary stamper blank having a second signal surface complementary to said first signal surface; and
   depositing a second polymerized release film having low surface energy on said second signal surface of said stamper blank, thereby forming a stamper.

2. A method according to claim 1, wherein said film of metal is approximately 400 angstroms thick and deposited by sputtering in an inactive gas under the pressure of approximately $5 \times 10^{-4}$ Torr.

3. A method according to claim 1, wherein said film of metal is deposited by vacuum evaporation.

4. A method according to claim 1, wherein said first film is made of polymerized octafluorocyclobutane and has a thickness of 200 angstroms.

5. A method according to claim 4, wherein said first film is deposited by glow discharge under the pressure of $10^{-1}$ Torr.

6. A method according to claim 1, wherein said layer of radiation curing resin has a thickness of the order of 200 microns.

7. A method according to claim 6, wherein said layer of radiation curing resin is hardened by exposure to ultraviolet radiation and is made of oligoesteracrylate.

8. A method according to claim 7, wherein said layer of radiation curing resin is exposed to ultraviolet radiation for about one minute.

9. A method according to claim 1, wherein said second film is made of polymerized octafluorocyclobutane and has a thickness in the range of from 100 to 400 angstroms.

10. A method according to claim 9, wherein said second film is deposited by glow discharge under the pressure of $10^{-1}$ Torr.

11. A method according to claim 1, wherein said substantially transparent plate is made of acrylic resin.

* * * * *